Patented Jan. 4, 1927.

1,613,590

UNITED STATES PATENT OFFICE.

WALTER S. LANDIS, OF WHITESTONE LANDING, NEW YORK, AND GUY H. BUCHANAN, OF WESTFIELD, NEW JERSEY, ASSIGNORS TO AMERICAN CYANAMID COMPANY, OF NEW YORK, N. Y., A CORPORATION OF MAINE.

METHOD OF FUMIGATING.

No Drawing. Application filed July 8, 1921. Serial No. 483,261.

This invention relates to methods of fumigating with highly poisonous fumigants, and has for its object to improve certain of the processes of this character which have been heretofore proposed and which are at present in wide use, to the end that they may be made more efficient and more safe for those engaged in carrying them out.

With these and other objects in view, the invention consists in the novel steps and combinations of steps constituting the process, all as will be more fully hereinafter disclosed and particularly pointed out in the claims.

In order that the invention may be the more clearly understood, it is said:

In the fumigation of enclosed spaces with highly poisonous fumigants such, for example, as hydrocyanic acid gas, the fumigant is introduced into the enclosure either by atomizing the liquid acid and permitting it to gasify, or by the direct generation of the gas within the enclosed space as by a chemical reaction between sulphuric acid and sodium cyanide. In these methods, the gas is employed in such quantity that when thoroughly diffused through the space, there will be a volume concentration of from one-fourth of one per cent to one per cent, depending upon the kind of pest to be eradicated.

In such dilute form, hydrocyanic acid gas possesses little odor, and therefore, its presence cannot be readily detected without chemical tests, although the quantities actually present may be sufficient to almost instantly kill a human being who attempts to breathe the gas mixture. As a result, fumigation by these methods has been accompanied by many fatalities, either due to persons being in the space to be fumigated at the time the hydrocyanic acid gas is introduced, or by persons walking into the enclosure after the hydrocyanic acid gas has been introduced, and before the enclosed space has been thoroughly ventilated.

On the other hand, we have found through experiments that certain gases when mixed with hydrocyanic acid gas have little or no chemical effect on the latter when in a dilute form. Yet these said dilute gases will, nevertheless, be sufficient to cause sneezing, difficult breathing, and other unpleasant sensations without actually endangering human life. Ammonia is one of such gases. Therefore, in carrying out this invention we, previous to the introduction of the hydrocyanic gas, fill the space to be fumigated with ammonia gas having a concentration of, say, one per cent or less. This dilute ammonia gas will rapidly diffuse throughout the space to be fumigated, and its pungent odor as well as the other effects above mentioned will serve as an effective warning to any person therein, and will cause him to seek outside air.

A suitable time after the introduction of the said ammonia, for example, say, one-half hour, we then introduce hydrocyanic acid gas or other fumigant in suitable dosage and maintain the space closed up for a suitable period of say one or two hours, or until the pests are eradicated. We may then open the space to the outside air and through effective ventilation remove the hydrocyanic acid or we may destroy the acid remaining within the enclosure in any suitable manner, as for example, by the method disclosed in our patent dated November 3, 1925, No. 1,559,892, entitled Process of fumigating.

The pungent odor of the ammonia will also serve as a means of warning until it is safe to again enter the space which has been fumigated.

The present procedure has many advantages; first, that ammonia is readily procured and very easy to introduce into a closed space, by a spray or otherwise. In the anhydrous form it may be readily transported in cylinders or other containers, and by connecting a suitable conducting tube to the cylinder, can be expanded and led into the closed space. Second, our method not only warns of the intended fumigation by driving human beings out of the enclosure, but also serves as a warning after fumigation is complete, or during its performance, to keep persons from entering the space before it is safe to do so. In this manner, we can avoid the many fatalities that are now continually occurring, particularly in the fumigation of ships in our various harbors.

In case it is desired to use the process of our said copending application for the destruction or neutralization of the hydrocyanic acid after the fumigation is complete, should the quantity of ammonia added before fumigating have been reduced by leakage, an additional quantity of $NH_3$ sufficient to make up the deficiency, if any exists over that needed for destruction, may be introduced after fumigation is complete. If an excess of ammonia is used, even in the case of use of our method of destruction of the hydrocyanic acid, that excess will serve the useful purpose of providing the after warning.

It is obvious that those skilled in the art may vary the details of the procedure without departing from the spirit of the invention, and therefore we do not wish to be limited to the above disclosure except as may be required by the claims.

What we claim is:

1. The method of fumigating with a highly poisonous inodorous fumigant which consists in introducing ammonia into the space to be fumigated to serve as a warning of the intended fumigation; and introducing said fumigant into said space, substantially as described.

2. The method of fumigating with a highly-poisonous inodorous fumigant which consists in first introducing ammonia gas in relatively small quantities into the space to be fumigated to serve as a warning of the intended fumigation; and subsequently introducing said fumigant into said space, substantially as described.

3. The method of fumigating with a highly poisonous inodorous fumigant which consists in first introducing ammonia into the space to be fumigated to produce a concentration of less than 5% to serve as a warning of the intended fumigation; and subsequently introducing said fumigant into said space, substantially as described.

In testimony whereof we affix our signatures.

WALTER S. LANDIS.
GUY H. BUCHANAN.